R. W. KALTENBACH.
CLAM SHELL BUCKET.
APPLICATION FILED MAR. 17, 1909.
1,010,634.
Patented Dec. 5, 1911.
2 SHEETS—SHEET 2.
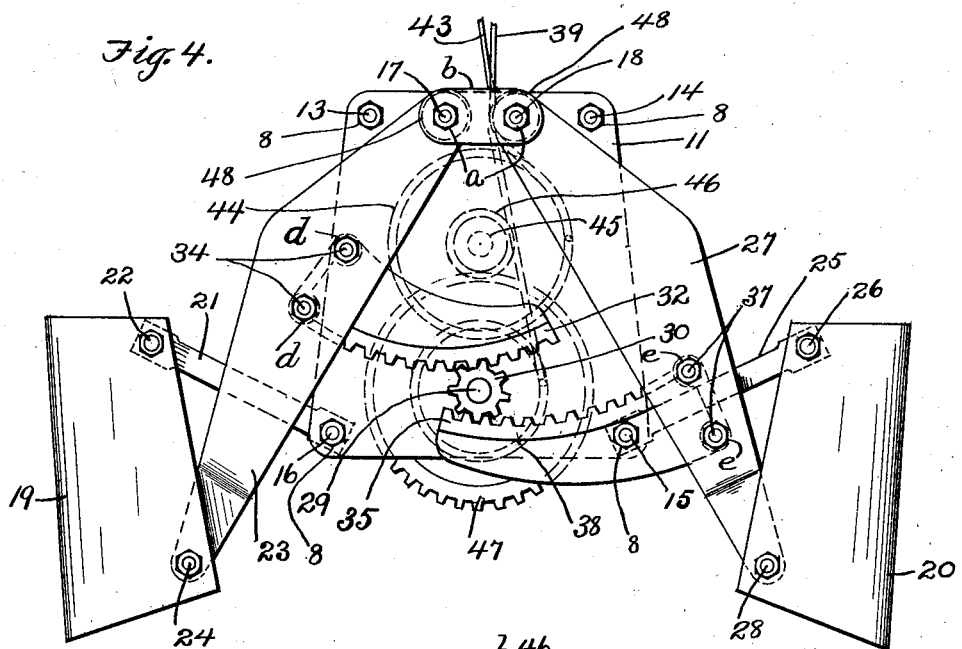
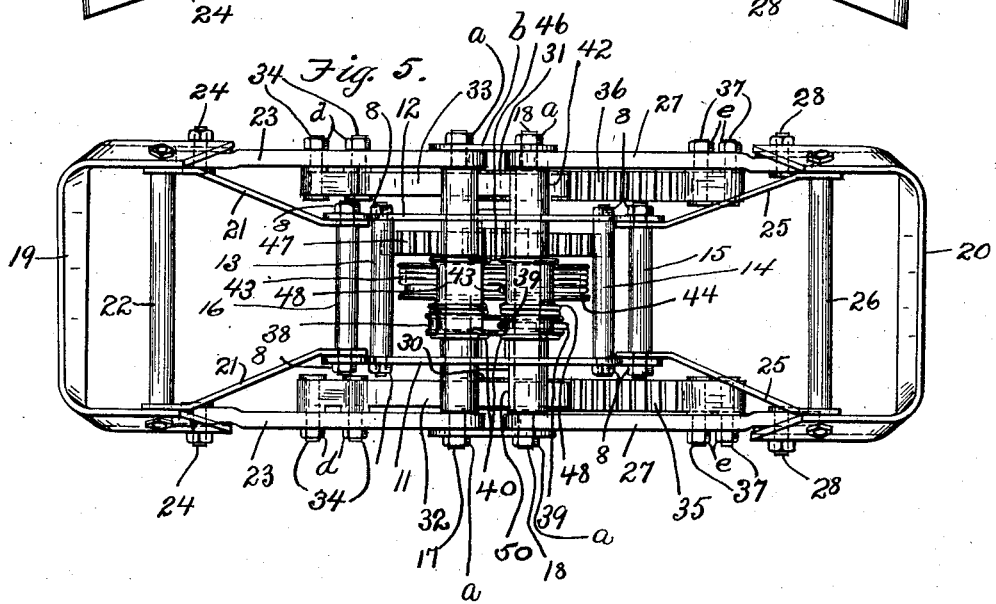
Witnesses:
H. J. Gittins.
B. C. Brown.
Inventor:
Robert W. Kaltenbach
By
his Attorneys.

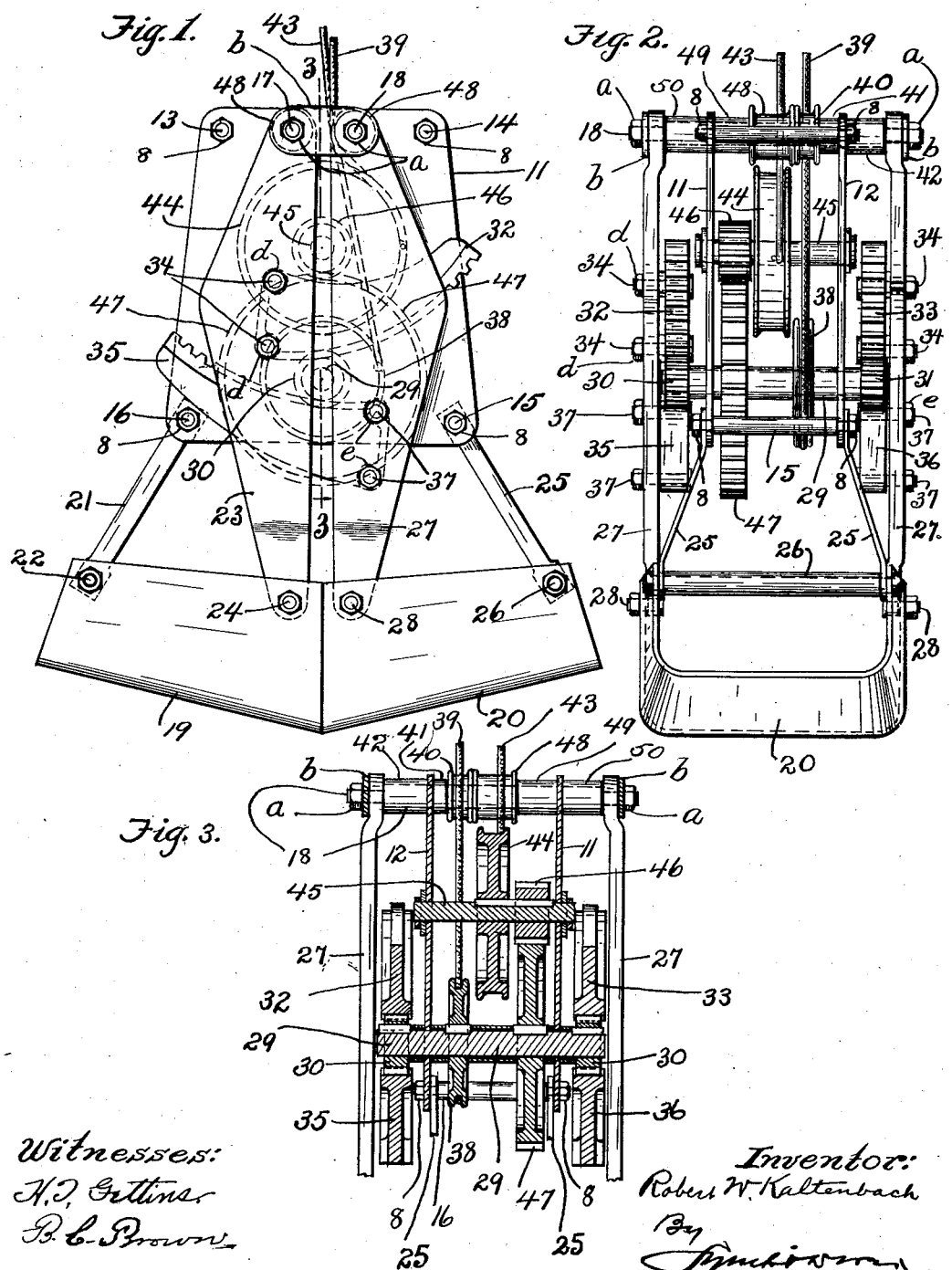

UNITED STATES PATENT OFFICE.

ROBERT W. KALTENBACH, OF CLEVELAND, OHIO.

CLAM-SHELL BUCKET.

1,010,634.   Specification of Letters Patent.   Patented Dec. 5, 1911.

Application filed March 17, 1909. Serial No. 483,941.

*To all whom it may concern:*

Be it known that I, ROBERT W. KALTENBACH, a citizen of the United States of America, residing at Cleveland, in the county of Cuyahoga and State of Ohio, have invented certain new and useful Improvements in Clam-Shell Buckets; and I hereby declare the following to be a full, clear, and exact description of the invention, such as will enable others skilled in the art to which it pertains to make and use the same.

This invention relates to improvements in clam-shell or grab buckets and has for one of its objects the provision of a bucket of the said type which is simple in construction, powerful and effective in operation.

A further object is to provide a bucket having an operating mechanism which is compact, reliable, composed of few parts and not liable to get out of order.

In carrying out my invention I provide a clam-shell bucket having a supporting frame and scoops or trays which are supported from the frame by means of pivoted links and operating levers connected to the frame and scoops. The mechanism for swinging the scoops toward and away from each other to close and open the bucket includes a shaft which is mounted in the frame and operatively connected with the levers and designed to be rotated in one direction and at a comparatively slow speed to close the bucket and in the opposite direction at a higher speed to open the bucket. This shaft is adapted to be rotated to open the bucket by means of a member which is operatively mounted directly upon the shaft and engaged by the bucket-opening rope or cable, and the shaft is adapted to be rotated in the opposite direction to close the bucket by means of a winding drum which is geared to said shaft and adapted to be engaged by the bucket-closing rope or cable. The said drum is preferably mounted on a shaft having a pinion which engages a comparatively large gear operatively mounted on the first-mentioned shaft upon which the member engaging the bucket-opening cable is directly mounted and which as already indicated is connected to the operating levers.

The first-mentioned shaft operates the levers preferably by gear-members including one or more pinions operatively mounted on the shaft and gear-segments attached to the levers. Preferably two such pinions are operatively mounted on opposite ends respectively of the said shaft, and two levers connected to opposite sides respectively of each scoop are provided with gear-segments which mesh with the said pinions so that the shaft will positively operate all the levers to open or close the bucket.

The gear-segments which are secured to the two levers connected to one scoop have external teeth which are properly arranged with respect to the axis or center of movement of said levers, and the segments secured to the levers connected to the other scoop have internal teeth also properly arranged with respect to the center of movement of such levers.

The invention may be further briefly summarized as consisting in certain novel details of construction, and combinations and arrangement of parts, hereinafter described, pointed out in the claims and illustrated in the accompanying drawings.

In the said drawings, Figure 1 is a side elevation of a clam-shell bucket constructed in accordance with my invention, the bucket being closed. Fig. 2 is an edge view of the same or a side view taken at a right angle to the view shown in Fig. 1. Fig. 3 is a vertical section on line 3—3, Fig. 1, looking in the direction indicated by the arrow. Fig. 4 is a side elevation of the bucket with the scoops in open position. Fig. 5 is a top plan relative to Fig. 4.

Upon reference to the said drawings, it will be observed that the supporting frame for the scoops and scoop-operating mechanism comprises two substantially vertically arranged metal side plates 11 and 12 which are spaced a suitable distance apart laterally and connected together by four bolts 13, 14, 15 and 16 which are arranged substantially horizontally between and extend through the said plates adjacent the corners of the plates. The said bolts are thick enough between the plates to brace or hold the latter apart and are reduced in thickness where they pass through the said plates, and nuts 8 are screwed onto the diametrically reduced ends of the said bolts at the outer sides of the said plates.

Near the top of the frame, between the two bolts 13 and 14 and preferably in line laterally with the latter, are two cross members 17 and 18 preferably in the form of bolts which pass through the plates and project suitable distances beyond the outer sides of the plates. The purpose of these cross members 17 and 18 will be referred to hereinafter. The scoops, which are shown at 19 and 20, are supported from the frame at the lower end of the frame by means of pivoted links and pivoted operating levers.

The scoop 19 is supported by means of two links 21 which are pivotally mounted on opposite ends respectively of the bolt 16 at the inner side of the plates 11 and 12 respectively and pivoted to opposite sides respectively of the rear end of the scoop by means of a pivotal pin or member 22 which is arranged parallel with the bolt 16 and which extends between the sides of the scoop at the upper rear part of the scoop. The scoop 19 is also supported by means of a pair of operating levers 23 which are loosely mounted or fulcrumed at their upper ends on opposite ends respectively of the bolt or cross member 17 passing through the upper part of the frame, and at their lower ends are pivotally connected to opposite sides respectively of the scoop at the upper forward portions of the scoop by bolts or members 24.

The scoop 20 is supported by two links 25 which are similar in all respects to the links 21 and pivotally mounted on opposite ends respectively of the bolt 15 at the inner side of the plates 11 and 12 respectively and pivoted to opposite sides respectively of the rear end of the scoop by a pivotal pin or member 26 which extends between the sides of the scoop at the upper rear portion of the scoop. The scoop 20 is supported also by a pair of operating levers 27 which are pivotally connected at their lower ends to opposite sides respectively of the scoop, as at 28, at the upper forward portions of the scoop, and are loosely mounted or fulcrumed at their upper ends on opposite ends respectively of the bolt or cross member 18 which, as already indicated, is adjacent the bolt or cross member 17 on which the opposite levers 23 are mounted. To prevent displacement of the levers 23 and 27 outwardly from the bolts 17 and 18 nuts $a$ are screwed onto the said bolts at the outer sides of the levers, and a washer $b$ is interposed between the inner end of each nut $a$ and the adjacent lever.

As was stated in the brief description of the invention, the scoops are designed to be swung toward and away from each other by mechanism including the shaft which is adapted to be rotated in opposite directions and is operatively connected to the levers which are in turn connected to the scoops respectively. This shaft referred to is shown at 29 and is mounted in the frame at the lower central part thereof. The shaft 29 is arranged centrally between the upper and lower ends of the levers 23 and 27 and parallel with the fulcrums of the said levers. The shaft 29 is arranged between the sweep of the levers 23 and the sweep of the levers 27. The shaft 29 projects through and beyond the outer sides of the side plates 11 and 12 of the frame, and pinions 30 and 31 are operatively mounted on the said shaft at opposite ends respectively of the shaft and at the outer side of the plates 11 and 12 respectively. The movements of the shaft 29 are conveyed to scoop 19 by means of gear-segments 32 and 33 secured by suitably applied bolts 34 and nuts $d$ to the levers 23 which are connected, as already indicated, to the scoop 19. That is, the gear-segment 32 is rigid with one of the levers 23, and the gear-segment 33 is rigid with the other of the said levers. The movements of the shaft 29 are conveyed to the scoop 20 by means of gear-segments 35 and 36 which are secured by suitably applied bolts 37 and nuts $e$ to the levers 27 which, as already indicated, are connected to the scoop 20. That is, the gear-segment 35 is rigid with one of the levers 27, and the gear-segment 36 is rigid with the other of the said levers. The gear-segments 32 and 33 mesh with the pinions 30 and 31 respectively at the top of the pinions and have, as is shown in the drawings, external teeth, or are segments of gears having external teeth, and in order that the shaft 29, may swing the levers 23 about their pivotal supports the external teeth of these segments are cut with pitch circles having centers coincident with the axis of the levers 23. The gear-segments 35 and 36 mesh with the pinions 30 and 31 respectively at the bottom of the pinions and have internal teeth, the pitch-circles of which have centers coincident with the axis of the levers 27. It will be observed therefore that adjacent levers 23 and 27 are arranged at opposite sides respectively of the axis of the shaft 29 and centrally between the rear or outer ends of the scoops; that the upper gear-segments 32 and 33 project from the connected levers 23 to and over and transversely of the shaft 29 and when the bucket is closed extend transversely of the levers 27, as shown in Fig. 1; that the lower gear-segments 35 and 36 project from the connected levers 27 to and under and transversely of the said shaft and when the bucket is closed extend transversely of the levers 23; that adjacent upper and lower gear-segments are spaced vertically and project equidistantly in opposite directions respectively and laterally of the pinion-bearing shaft 29; that each gear-segment is arranged intermediate the fulcrum of the connected lever and the scoop connected with the said lever; that the gear-segments are arranged far enough above the forward ends of the scoops in the open position of the bucket, as shown in Fig. 4, to be out of the way of the material to be excavated or operated upon by the scoops during the actuation of the scoops from their open into their closed position, and that the gear-segments, the pinion-bearing shafts 29 and the levers 23 and 27 are most compactly arranged.

The shaft 29 is designed to be rotated in one direction so as to open the bucket with a comparatively quick movement by means of a member 38 operatively mounted directly upon the shaft, said member 38 being in the form of a bull-wheel or cable-winding wheel which is adapted to be operatively engaged by an opening rope or cable 39 suitably attached to the said wheel, which cable passes from the wheel 38 upwardly to and between two sheaves 40 mounted on the bolts 17 and 18 respectively. These sheaves are spaced from the side plate 12 of the frame by means of spacing sleeves 41, and the adjacent levers 23 and 27 are spaced from the said side plate by spacing sleeves 42. The relative arrangement of the parts is such that when the bucket is closed enough of the cable 39 is wound upon the wheel 38 to accommodate the rotation of the said wheel by pulling upon and unwinding the said cable from the said wheel and thereby rotating the said wheel and connected shaft to the extent required to cause the scoops to be swung outwardly and away from each other so as to open the bucket. The parts are so designed and relatively arranged that the scoops can be swung from the closed to the full open position during one rotation of the wheel 38.

The rope or cable for closing the bucket is shown at 43, and this cable operatively engages a winding drum 44 to which the said cable is suitably attached, which drum is geared to the shaft 29 in a manner such that the bucket will be closed with a slow movement compared with the movement when the bucket is being opened, and also in a manner such as to provide a powerful closing mechanism. The drum 44 is here shown as operatively mounted on a shaft 45 which is located directly above and parallel with the shaft 29 and mounted in the side plates 11 and 12 of the frame. Operatively mounted on the shaft 45 at one end of the drum 43 is a pinion 46 which meshes with a gear 47 operatively mounted on the shaft 29 between the side plate 11 of the frame and the bucket-opening wheel 38. The diameter of the gear 47 is shown four times greater than the diameter of the pinion 46 so that to produce one rotation of the shaft 29 it will be necessary to rotate the drum 44, shaft 45 and pinion 46 four times, and at the same time the force transmitted through the closing cable 43 will be multiplied by the gearing. The cable 43 passes between two sheaves 48 located adjacent the sheaves 40 and mounted on the bolts 17 and 18 respectively. The sheaves 48 are spaced from the side plate 11 by spacing sleeves 49 and the said side plate is spaced from the adjacent levers 23 and 27 by spacing sleeves 50.

The relative arrangement of the parts is such that when the bucket is open enough cable 43 is wound upon the drum 44 to accommodate the rotation of the drum by pulling upon and unwinding the cable 43 from the drum and thereby rotating the said drum and consequently the shaft 29 to the extent required to cause the scoops to be swung inwardly or toward each other so as to close the bucket.

By the construction and relative arrangement of the parts hereinbefore described and illustrated it will be observed that during the operation of the bucket-opening cable 39 to open the bucket the drum 44 is rotated in the direction required to wind the engaging bucket-closing cable 43 several times around the drum and during the operation of the bucket-closing cable 43 to close the bucket the wheel 38 is rotated in the direction required to wind up the engaging bucket-opening cable 39.

By the construction and relative arrangement of the parts hereinbefore described it will be observed also that the bull-wheel or cable-winding wheel 38, which is operatively engaged by the bucket-opening rope or cable 39, is operatively mounted on the pinion-bearing shaft 29 and consequently independent of the winding drum 44 operatively engaged by the bucket-closing rope or cable 43, and obviously less travel of the bucket-opening cable than of the bucket-closing cable is required, and the length of the bucket-opening cable is reduced to a minimum.

It is to be noted that, by my improved construction and particularly by utilizing the shaft 29 and the gearing operatively connecting the said shaft with the levers for accomplishing both the closing movement and opening movement of the scoops, a very simple operating mechanism is provided, and furthermore that the necessity of attaching the bucket-opening cable directly to the scoops or to separate members connected to the scoops is avoided. I would remark however that the peculiar arrangement of the parts to render the bucket compact and durable in construction and effective and reliable in its operation and more especially to cause the scoops to be separated a desirable distance in the open position of the bucket, is not unimportant. To this end the side plates 11 and 12 of the supporting frame are not only arranged substantially vertically but the levers 23 and 27 adjacent each plate are arranged at and a suitable distance from the outer side of the said plate and the gear-segments of the said levers are arranged at the inner sides of the levers but at the outer side of the said plate, whereas the winding drum 44, the bucket-opening member 38, the pinion 46 and the gear 47 are arranged between the two plates. As already indicated, the two oppositely arranged scoops are pivotally supported at their rear ends from the frame through the medium of the links 21 and 25 to render the scoops capable of being swung outwardly or away from each other, and inwardly or toward each other to open and close the bucket respectively, and that at the outer side of each of the side plates are therefore arranged two levers 23 and 27 which are pivoted at their lower ends, substantially horizontally and parallelly with the shafts 45 and 29, to the different scoops respectively at the forward end of the scoop, and fulcrumed at their upper ends substantially horizontally and parallelly with the said shafts to the frame comprising said plates, and that the said levers when the bucket is closed are arranged wholly at opposite sides respectively of the axis of the said shafts and substantially vertically.

Preferably the arrangement of the parts is such that the fulcrum or axis of each lever and the pivotal connection between the said lever and the connected scoop are arranged substantially in line vertically when the bucket is closed and the said levers are swung outwardly and inwardly in opening and closing the bucket respectively. The gear-segment of each lever 23, having external teeth, is consequently the segment of a spur-gear, and, meshing with the engaging pinion at the top of the pinion, consequently extends transversely of the upper side of the shaft carrying the said pinion. The internal-gear-segment of each lever 27, meshing with the said pinion at the bottom of the pinion, consequently extends transversely of the under side of the shaft. Obviously each gear-segment is not only arranged concentrically relative to the fulcrum or axis of the lever provided with the said segment, but extends far enough circumferentially of the said fulcrum or axis to be in proper mesh with the engaging pinion in the closed and open positions of the bucket.

It will be observed that the construction hereinbefore described results in the production of a strong, durable and powerful bucket, and not unimportant in this construction is the relative arrangement of the parts whereby the operating mechanism is not only rendered compact, but the weight of the said mechanism is equally distributed over both scoops of the bucket.

What I claim is:—

1. In a clam-shell bucket, a supporting frame; two oppositely arranged scoops arranged at the lower end of the frame and pivotally connected at their rear ends to the frame to render them capable of being swung outwardly and inwardly to open and close the bucket respectively; two upright levers operatively connected with the different scoops respectively at the forward portion of the respective scoop and fulcrumed to the frame and arranged to swing the connected scoop outwardly and inwardly; two vertically spaced shafts mounted in the frame and parallel with the fulcrums of the levers and arranged between the sweeps of the levers; a winding drum operatively mounted on the upper shaft; the bucket-closing cable operatively engaging the drum and being coiled around the drum when the bucket is open; a pinion operatively mounted on the upper shaft; a spur-gear meshing with the said pinion and operatively mounted on the lower shaft and rotating the latter in one direction during the rotation of the upper shaft by the operation of the bucket-closing cable; means for rotating the lower shaft in the opposite direction, and means for communicating motion from the lower shaft to the levers to cause the levers to be swung in the one or the other direction according as the lower shaft is rotated in the one direction or the other.

2. In a clam-shell bucket, a supporting frame; two oppositely arranged scoops arranged at the lower end of the frame and supported at their rear ends from the frame to render them capable of being swung outwardly and inwardly; two levers operatively connected with the different scoops respectively at the forward portion of the respective scoop and fulcrumed to the frame and arranged to swing the connected scoop outwardly and inwardly to open and close the bucket; two vertically spaced shafts mounted in the frame and parallel with the fulcrums of the levers and arranged between the sweeps of the levers, the lower shaft being intergeared with the levers; a winding drum operatively mounted on the upper shaft; the bucket-closing cable operatively engaging the drum and being coiled around the drum when the bucket is open; a pinion operatively mounted on the upper shaft; a spur-gear meshing with the said pinion and operatively mounted on the lower shaft and rotating the latter in one direction during the rotation of the upper shaft by the operation of the bucket-closing cable, and means for rotating the lower shaft in the opposite direction.

3. In a clam-shell bucket, a supporting frame, two vertically spaced substantially parallel shafts arranged transversely of and mounted in the frame, a winding drum operatively mounted on the upper shaft, the bucket-closing cable operatively engaging the drum and being coiled several times around the drum when the bucket is open, a pinion operatively mounted on the upper shaft, a spur-gear meshing with the said pinion and operatively mounted on the lower shaft and rotating the latter in one direction during the rotation of the upper shaft by the operation of the bucket-closing cable, means for rotating the lower shaft in the opposite direction, scoops arranged at the lower end of the frame and pivotally supported at their rear ends from the frame to render them capable of being swung outwardly and inwardly to open and close the bucket respectively, upright levers pivoted to the different scoops respectively at the forward end of the respective scoop and fulcrumed to the frame and arranged to swing the connected scoop outwardly and inwardly, and means for communicating motion from the lower shaft to the levers to cause the levers to be swung in the one or the other direction according as the lower shaft is rotated in the one direction or the other.

4. In a clam-shell bucket, a supporting frame, two vertically spaced substantially parallel shafts arranged transversely of and mounted in the frame, a winding drum operatively mounted on the upper shaft, the bucket-closing cable operatively engaging the drum and being coiled several times around the drum when the bucket is open, a pinion operatively mounted on the upper shaft, a spur-gear meshing with the said pinion and operatively mounted on the lower shaft and rotating the latter in one direction during the rotation of the upper shaft by the operation of the bucket-closing cable, means for rotating the lower shaft in the opposite direction, scoops arranged at the lower end of the frame and supported at their rear ends from the frame to render them capable of being swung outwardly and inwardly, and upright levers pivoted to the different scoops respectively at the forward end of the respective scoop and fulcrumed to the frame and arranged to swing the connected scoop outwardly and inwardly to open and close the bucket, said levers being intergeared with the lower shaft.

5. In a clam-shell bucket, a supporting frame, two vertically spaced substantially parallel shafts arranged transversely of and mounted in the frame, a winding drum operatively mounted on the upper shaft, the bucket-closing cable operatively engaging the drum and being coiled around the drum when the bucket is open, a pinion operatively mounted on the upper shaft, a spur-gear meshing with the said pinion and operatively mounted on the lower shaft and rotating the latter in one direction during the rotation of the upper shaft by the operation of the bucket-closing cable, means for rotating the lower shaft in the opposite direction, pinions operatively mounted on the lower shaft, scoops supported at their rear ends from the frame to render them capable of being swung outwardly and inwardly, upright levers pivoted to the scoops at the forward ends of the scoops and fulcrumed to the frame and arranged to swing the scoops outwardly and inwardly to open and close the bucket, and gear-segments rigid with the levers and meshing with the last-mentioned pinions and having their pitch-circles arranged concentrically relative to the fulcrums of the levers, each gear-segment extending far enough circumferentially of the axis of the connected lever to be in mesh with the engaging pinion in the open and closed positions of the bucket.

6. In a clam-shell bucket, a supporting frame, two vertically spaced substantially parallel shafts arranged transversely of and mounted in the frame, a winding drum operatively mounted on the upper shaft, the bucket-closing cable operatively engaging the drum and being coiled around the drum when the bucket is open, a pinion operatively mounted on the upper shaft, a spur-gear meshing with the said pinion and operatively mounted on the lower shaft and rotating the latter in one direction during the rotation of the upper shaft by the operation of the bucket-closing cable, a cable-receiving rotary member operatively mounted on the lower shaft for rotating the latter in the opposite direction, a bucket-opening cable operatively engaging the last-mentioned cable-receiving member and coiled around the said cable-receiving member in the closed position of the bucket, scoops arranged at the lower end of the frame and supported at their rear ends from the frame to render them capable of being swung outwardly and inwardly, upright levers pivoted to the scoops at the forward ends of the scoops and fulcrumed to the frame and arranged to swing the scoops outwardly and inwardly to open and close the bucket, and means for communicating motion from the lower shaft to the levers to cause the levers to be swung in the one direction or the other according as the lower shaft is rotated in the one or the other direction.

In testimony whereof, I sign the foregoing specification, in the presence of two witnesses.

ROBERT W. KALTENBACH.

Witnesses.
    C. H. DORER,
    B. C. BROWN.

---

Copies of this patent may be obtained for five cents each, by addressing the "Commissioner of Patents, Washington, D. C."